Sept. 27, 1932.     A. C. HOUGLAND     1,879,255
DRIVING MECHANISM FOR CHURNS
Filed Feb. 10, 1930     2 Sheets-Sheet 1
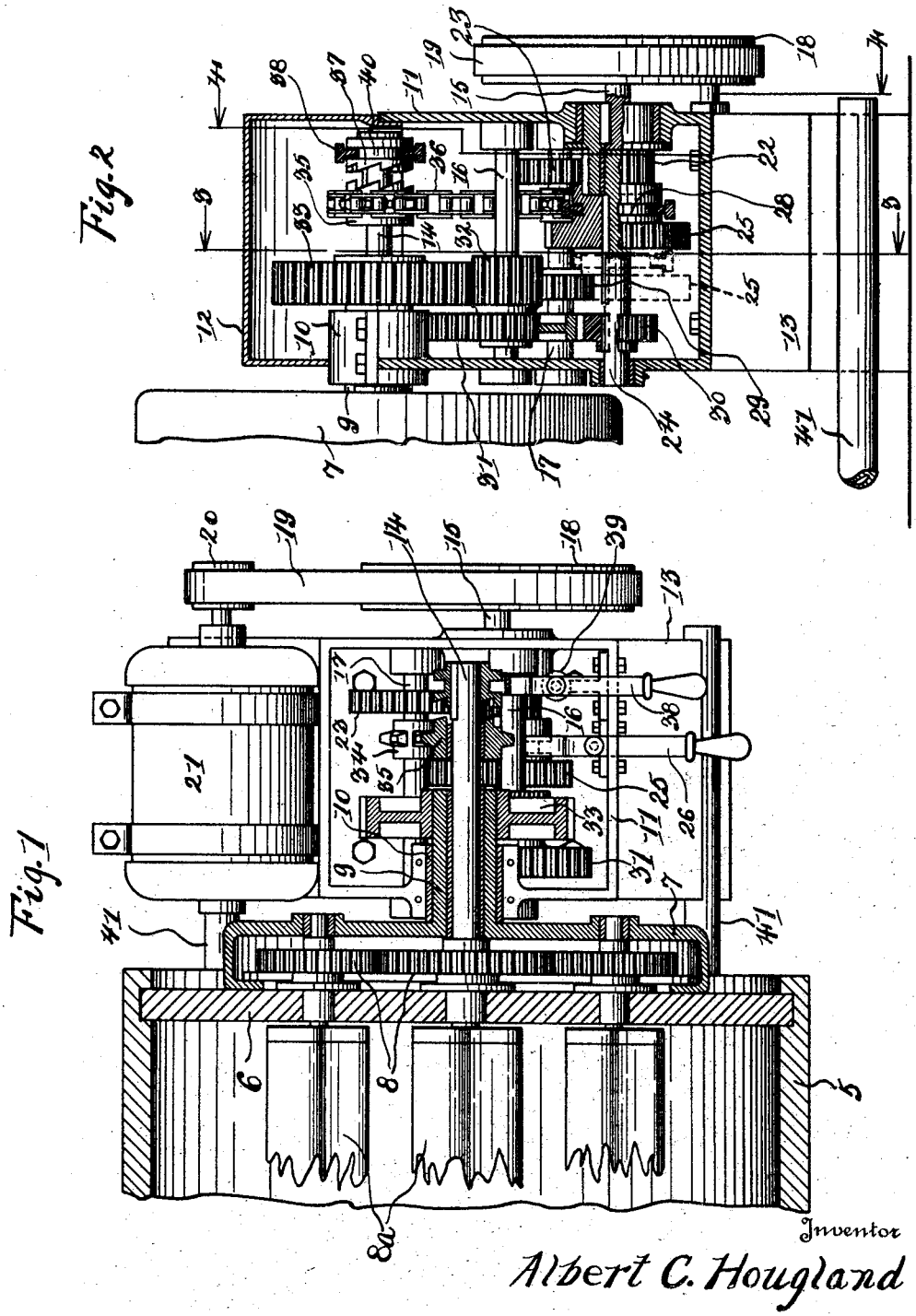
Inventor
Albert C. Hougland
By Stryker & Stryker
Attorneys

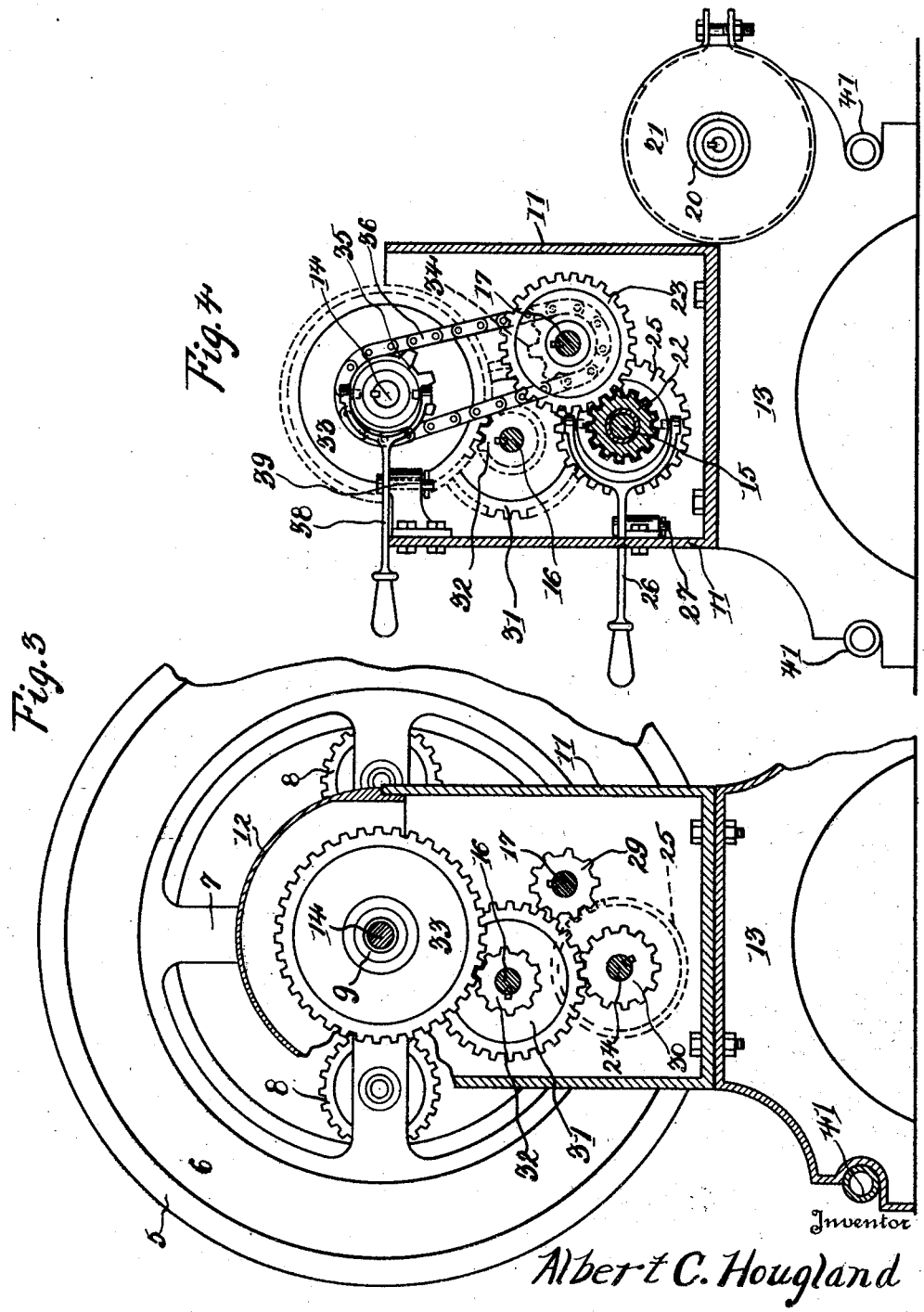

Patented Sept. 27, 1932

1,879,255

UNITED STATES PATENT OFFICE

ALBERT C. HOUGLAND, OF ST. PAUL, MINNESOTA

DRIVING MECHANISM FOR CHURNS

Application filed February 10, 1930. Serial No. 427,135.

It is my object to provide driving mechanism for churns which is unusually compact and efficiently protected by a casing or housing. More particularly, it is my object to eliminate the large, exposed ring gears which have heretofore been employed to rotate commercial churns and at the same time to provide an improved arrangement of driving mechanism whereby the butter working rolls or elements may be operated without rotating the body or churn barrel.

In the accompanying drawings I have illustrated the best form of my device at present known to me. Referring to the drawings, Figure 1 is a horizontal section through the driving mechanism and adjacent end of the churn taken through the axis of the churn; Fig. 2 is a side elevation of the churn with portions broken away to show parts otherwise concealed; Fig. 3 is a vertical section taken on the line 3—3 of Fig. 2 and Fig. 4 is an irregular, fragmentary section taken on the line 4—4 of Fig. 2.

In the drawings, the numeral 5 indicates a large commercial churn of common type adapted to be rotated upon a horizontal axis and having an end wall or head 6. Mounted on the outer surface of the head 6 is a large spider 7 bolted to the churn for supporting it. This spider is concentric with the axis of the churn and affords a support for gears 8 for driving butter working rolls 8a within the churn. The rolls 8a may be connected together and arranged to be driven by a shaft projecting axially from the churn, as described in my copending application for patent on driving mechanism for butter working rolls, Serial No. 241,844, filed December 22, 1927, or the butter working rolls may be arranged in any suitable or well-known manner, as the present invention does not include details such as the number and arrangement of the rolls and driving connections between them.

Integral with the spider 7 and projecting axially from the end of the churn is a tubular shaft 9. This shaft 9, which supports an end of the churn, is journaled in a suitable bearing 10 formed in a gear housing 11 having a cover 12. A base 13 supports the housing 11 and bearing 10. A shaft 14, arranged coaxially with the tubular shaft 9 and extending therethrough, is provided to drive the central gear 8, as described in my copending application hereinbefore identified. Parallel to the shaft 14 in the housing 11 is a power-driven shaft 15 and two countershafts 16 and 17. The shaft 15 projects from an end of the housing 11 and has fixed thereon a drive pulley 18 having suitable connections, such as a belt 19 and pulley 20, for operating the shaft 15 from an electric motor 21.

As best shown in Fig. 2, a pinion 22 is fixed on the drive shaft 15 and disposed in continuous mesh with a gear 23 for driving the shaft 17. In axial alignment with the shaft 15 is a shaft 24 carrying a sliding gear 25 on its end adjacent to the pinion 22. This sliding gear 25 is keyed to shaft 24 and has a recessed face which is adapted to be moved into driving engagement with teeth on the gear 22. An operating lever 26 is provided to move the gear 25 into and out of driving relation with the pinion 22. The lever 26 has a pivotal support 27 on the housing 11 and engages a hub on the gear 25 in a suitable annular recess 28, a forked end on said lever being provided in well known arrangement. The gear 25 is movable by the lever 26 to the dotted line position indicated in Fig. 2 where it is in mesh with a pinion 29 on the shaft 17. Another pinion 30 is fixed on the shaft 24 in meshing engagement with a gear 31 for driving the shaft 16. From the shaft 16 power is transmitted through a pinion 32 to a large gear 33 which is keyed to a tubular shaft 9 for rotating the churn body 5. The shaft 14 may be driven from the shaft 17 through sprocket wheels 34 and 35 and a connecting chain 36. The sprocket wheel 35 is freely revoluble on the shaft 14 and a clutch element 37 is keyed to said shaft but arranged to slide longitudinally thereon. The adjacent faces of the element 37 and sprocket wheel 35 have suitable teeth formed thereon to interlock with each other and a clutch lever 38 has a pivotal support 39 on the housing 11 and a forked end which engages in an annular groove 40 in the clutch element 37. It will be understood that the churn body 5 has the usual or suitable journal support for its end not shown. Such support may be connected to the base 13 by rigid, longitudinal frame members 41 of any suitable or well known construction.

Operation

In the normal operation of churns of the commercial type it is necessary to rotate the barrel or body of the churn at a higher speed during the churning operation than during the operation of working the butter. My device is designed to meet this requirement. The shaft 15 is normally driven through the connections above described from the motor 21 and when neither churning nor butter working is desired the sliding gear 25 is moved to neutral position midway between its full line and dotted line positions shown in Fig. 2, and the clutch element 37 is withdrawn from engagement with the sprocket wheel 35. This allows the butter working rolls and churn body to remain stationary. When the levers are in the positions thus indicated, the drive pinion 22 on the shaft 15 merely causes the shaft 17, sprocket wheels 34 and 35 and chain 36 to idle.

When the churn body 5 has been charged with cream, preparatory to churning, the lever 26 may be manipulated in the appropriate direction to shift the gear 25 to the full line position shown in Fig. 2 where it is directly driven by the pinion 22 and thereby drives the shaft 24. Through the gears 30, 31, 32 and 33 and shaft 16 the large tubular shaft 9 is driven and the churn body is turned at the higher speed. This operation may be continued until the churning is complete after which the churn may be stopped and the buttermilk drawn off.

To work the butter, the lever 26 is manipulated to shift the gear 25 to the left, as seen in Figs. 1 and 2, to its dotted line position where it meshes with the pinion 29 on the shaft 17. The latter shaft, being continuously driven through the pinion 22 and gear 23, is thus connected by the pinion 29 to the sliding gear 25 so as to drive the shaft 24 at a reduced speed and the gears 30, 31, 32 and 33 and shaft 16 transmit power to the tubular shaft 9 for driving the churn. To complete the connection with the butter working rolls the lever 38 is operated to move the clutch element 37 into engagement with the sprocket wheel 35. This causes rotation of the shaft 14 for driving the butter working rolls 8a through their connecting gears 8. When it is desired to discontinue the working of the butter, the lever 26 is moved to slide the gear 25 to its neutral or intermediate position and if it is desired to stop the rolls as well as the churn body, the lever 38 is actuated to withdraw the clutch element 37 from the sprocket wheel 35. However, it is frequently desirable to operate the butter working rolls while the churn body is stationary, such as when it is desired to work the butter into the bottom of the churn preparatory to removing it therefrom. It will be understood that this independent operation of the butter working rolls is accomplished merely by connecting the clutch element 37 with the sprocket wheel 35 while the sliding gear 25 is in its idle or neutral position. The rolls are thus turned, the driving connection being established by the pinion 22, gear 23, shaft 17, sprocket wheels 34 and 35, chain 36, clutch element 37 and shaft 14.

One of the important advantages secured by my device is the elimination of the large ring gear which has heretofore been provided for rotating the churn body. Such large ring gears have been exposed to dust, liquids and other harmful substances which reach exposed gearing in a creamery. A further objection to old types of churns is the excessive amount of floor space occupied thereby. I have greatly shortened the operating mechanism by my arrangement in a peculiarly compact housing. My improvements render the mechanism more durable by affording increased protection.

Having described my invention what I claim as new and desire to protect by Letters Patent is:

1. Driving mechanism for a churn having a revoluble body and butter working elements comprising, a power shaft, a second shaft operatively connected to said churn body, a third shaft operatively connected to said butter working elements, a fourth shaft disposed in axial alignment with said power shaft and operatively connected to said second shaft, and means for selectively driving said fourth shaft either directly from said power shaft or through said third shaft.

2. Driving mechanism for a churn having a revoluble body and butter working elements comprising, a power shaft, a second shaft operatively connected to said churn body, a third shaft operatively connected to said butter working elements, a fourth shaft disposed in axial alignment with said power shaft and operatively connected to said second shaft, means for selectively driving said fourth shaft either directly from said power shaft or through said third shaft and a housing enclosing all of said shafts and the connections between them.

3. Driving mechanism for a churn having a revoluble body and butter working elements comprising, a power shaft, a second shaft for turning said churn body, a third shaft for operating said butter working elements, a fourth shaft disposed in axial alignment with said power shaft and operatively connected to said second shaft, means for driving said butter working elements from said third shaft, means for turning said churn body from said second shaft and means for selectively driving said fourth shaft either directly from said power shaft or through said third shaft.

4. In driving mechanism for a churn having a revoluble body and butter working elements, a plurality of driven shafts projecting from an end of said body, one of said shafts being operatively connected to said body and another of said shafts being operatively connected to said butter working elements for driving the same, a housing enclosing portions of said shafts, a power-driven shaft in said housing, a countershaft operatively connected to one of said driven shafts for driving the same, a second countershaft operatively connected to the other of said driven shafts for driving the same and change speed gearing for operating said driven shafts, including means for rotating one of said driven shafts selectively through one or both of said countershafts.

5. In driving mechanism for a churn having a revoluble body and butter working elements, a plurality of driven shafts disposed coaxially to each other and to said churn body, a pair of countershafts, one of said coaxial shafts being operatively connected to a countershaft to be driven thereby and the other of said countershafts being operatively connected to another of said coaxial shafts for driving the same and change speed gearing, including means for rotating one of said coaxial shafts selectively through one or both of said countershafts.

In testimony whereof, I have hereunto signed my name to this specification.

ALBERT C. HOUGLAND.